Dec. 2, 1952 — M. E. LARSEN — 2,619,890
TILLAGE IMPLEMENT FRAME
Filed Aug. 17, 1946 — 2 SHEETS—SHEET 1
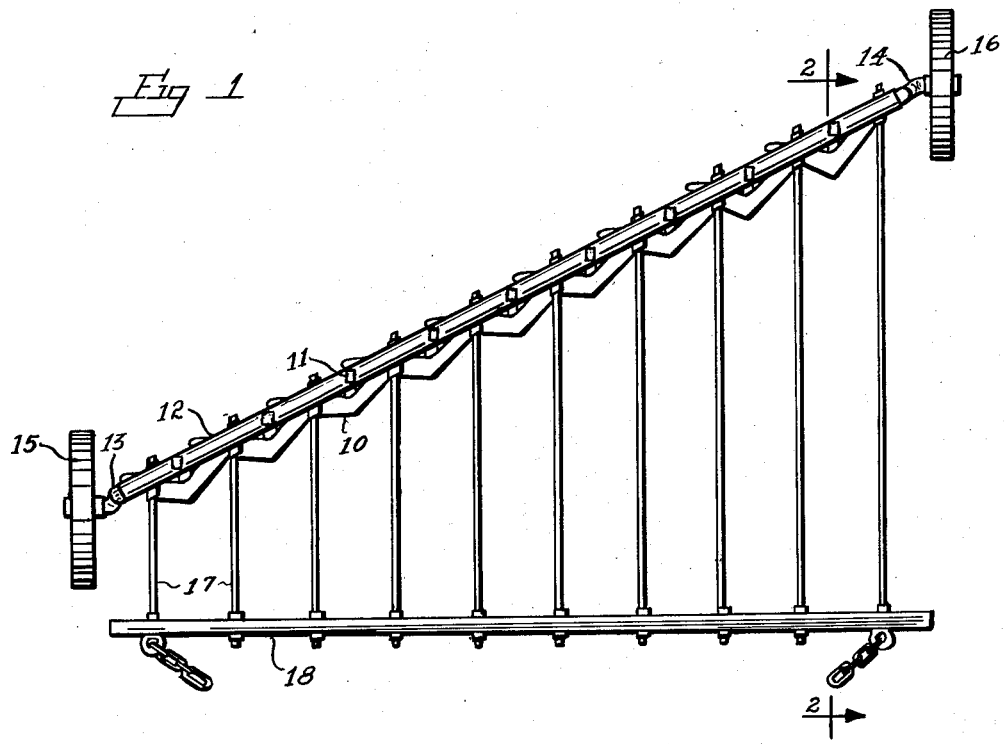
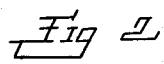
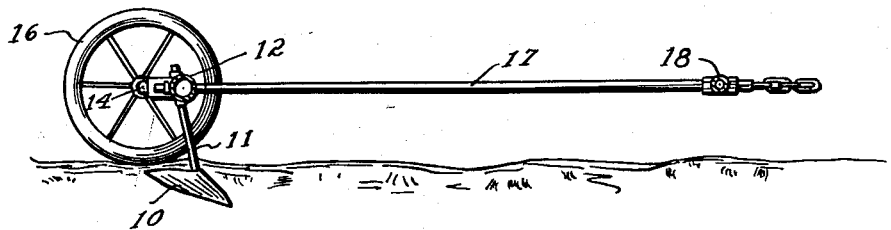
INVENTOR.
MILNER E. LARSEN
BY
Smith & Wells.

Dec. 2, 1952          M. E. LARSEN          2,619,890
TILLAGE IMPLEMENT FRAME
Filed Aug. 17, 1946                          2 SHEETS—SHEET 2
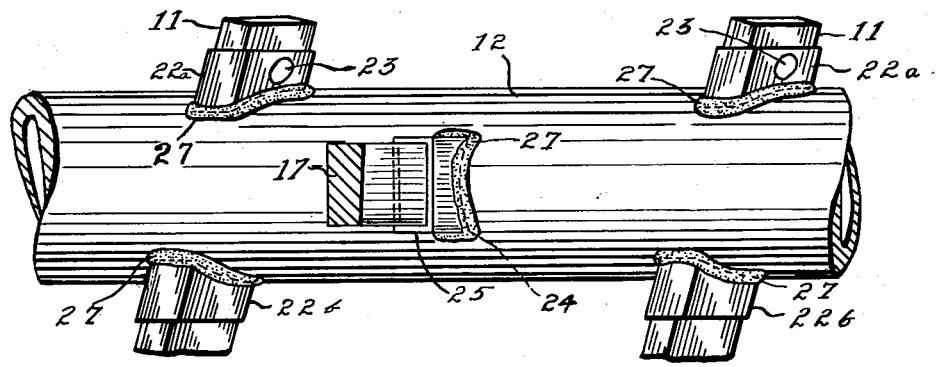
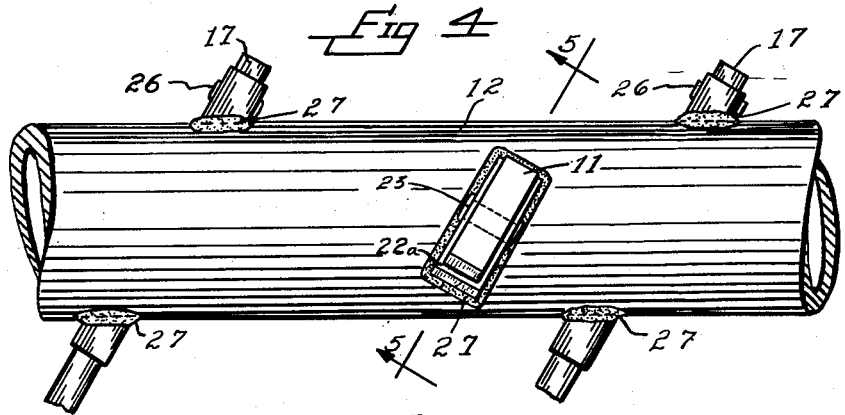
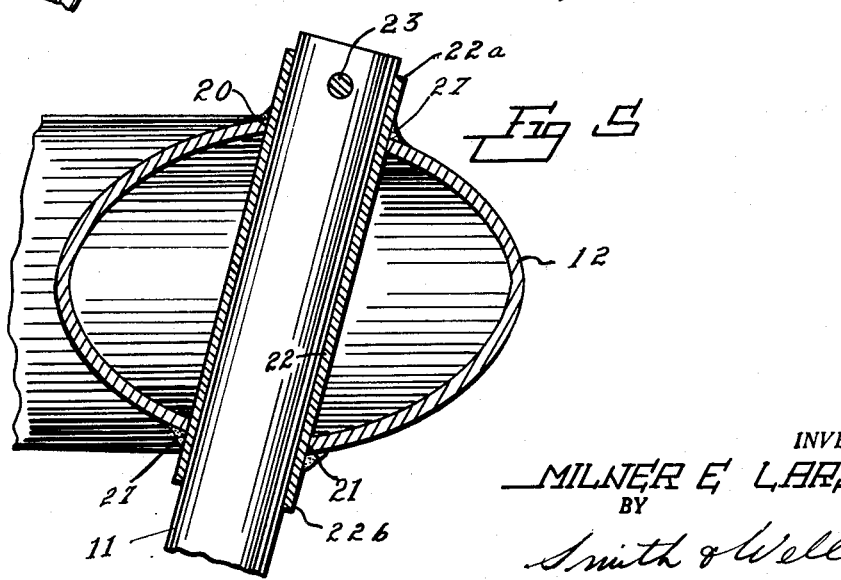
INVENTOR.
MILNER E. LARSEN
BY
Smith & Wells.

Patented Dec. 2, 1952

2,619,890

UNITED STATES PATENT OFFICE 2,619,890

TILLAGE IMPLEMENT FRAME

Milner E. Larsen, Bickleton, Wash.

Application August 17, 1946, Serial No. 691,235

1 Claim. (Cl. 97—162)

The present invention relates to a tillage implement frame.

The present invention is particularly applicable to the mounting of gang implements such as plows for breaking up the surface of the soil. These implements may be of various types, but in particular, the frame is shown as adapted for mounting a series of the so-called "duck foot" type of plow. It is the principal purpose of the invention to provide a novel frame construction whereby that portion of the frame which usually extends diagonally so as to mount the implements in spaced relation with each implement located behind and spaced laterally from the implement on one side and located slightly ahead of the implement on the other side. In accordance with my invention, I utilize a piece of tubing for the main frame so that the tubing may serve to mount the supporting wheels and in addition to mount the several members to which the actual tillage implement is secured. The frame of tubing is pierced to receive rectangular bars that form the implement supporting means. They are also pierced to receive horizontally running draw bars by which the main frame is secured to a tractor or the like. In mounting the draw bars and the implement supporting bars, sleeves are provided to extend through the tube which forms the main frame, these sleeves being welded in place. The bars are secured in the sleeve by some suitable means such as rivets so as to form a rigid construction.

My invention contemplates a frame of the character described wherein the implement supporting bars and the draw bars are so mounted so that the forces are distributed in the main frame to take advantage of the tubular shape thereof and the diagonal direction thereof so that each individual bar is well braced both lengthwise and crosswise of the tubing.

It is also a purpose of my invention to provide a frame of the character described wherein the individual bars may in the event of breakage or destruction be replaced without destroying or damaging the other bars and with no particular damage to the frame itself.

The novel features that I consider characteristic of my invention are set forth with particularity in the claims. The invention itself, however, both as to its organization and its method of operation, together with additional objects and advantages thereof, will be understood from the description of a specific embodiment when read in connection with the accompanying drawings, in which:

Figure 1 is a plan view of a tilling implement having a frame embodying my invention;

Figure 2 is a sectional view taken at right angles to Figure 1 on the line 2—2 thereof;

Figure 3 is an enlarged view in side elevation of a portion of the frame;

Figure 4 is a plan view of a portion of the frame; and

Figure 5 is a cross sectional view taken substantially on the line 5—5 of Figure 4 showing the frame and an implement supporting bar on an enlarged scale.

Referring now to the drawings, my invention is shown as embodied in a tillage implement employing the so-called "duck foot" type of plow. The plows are indicated by the numeral 10. Each plow is supported by a bar 11 which desirably may be a steel bar rectangular in cross section. The several bars 11 are supported in turn by a main frame 12 which is a steel tube. The frame 12 receives the axles 13 and 14 for supporting wheels 15 and 16. As an example of the manner in which the frame 12 may mount the axles, these axles may be formed of round steel shafting and bent to extend at an angle to the wheel receiving portion of the axles and then parallel to the wheel receiving portion to extend into the tube 12 and be anchored therein.

My invention is concerned primarily with the mounting in the tube 12 of the bars 11 and the mounting of draw bars 17 by which the tube 12 is connected to a cross frame 18 that may be attached to a tractor or other power source for drawing the plows through the ground. As shown best in Figures 3, 4, and 5, the bars 11 are extended through the tube 12 by piercing upper and lower rectangular apertures 20 and 21 in the tube 12, the apertures being set diagonally of the tube with their long axes extending across the tube. Then in the apertures 20 and 21 I mount a sleeve 22. This sleeve is extended above and below the tube 12 as shown at 22a and 22b and is welded in place in the tube 12. The bar 11 is then mounted in the tube 12 by extending it through the sleeve 22 and securing it by means of a rivet 23 through the upper extended portion 22a of the sleeve. The bars 11 are so mounted as to extend downwardly and forwardly from the tube 12 to the point where the plows 10 are secured thereon.

The draw bars 17 are mounted in the tube 12 in a generally similar manner. Sleeves 25 are extended through apertures 24 that are pierced in the tube 12 and are welded in place so that they cannot be withdrawn. The draw bars 17 extend through the sleeves and are secured by rivets 26 or like fastening means. The draw bars may, if desired, be driven out of the sleeves 25 by removal of one of the fastening means 26. Likewise, a supporting bar 11 can be replaced by removal of the rivet 23 that secures it in position. The sleeve 25 projects beyond the tube 12 at both ends so as to provide additional bearing for the draw bar 17.

In the use of the frame hereinbefore described, the plows 10 of course tend to rotate the bars 11 about the tube 12. The forces are in part distributed by the sleeve 22 so as to avoid a concentration of forces where the bar 11 enters the tube 12. The force is in part lengthwise of the tube 12 and in part circumferential thereof due to the diagonal position of the bar with respect to the tube. This distribution of forces exists also in the relation of the bar 17 in the tube 12. Rotative force on the tube 12 caused by the bars 11 is communicated to the bars 17 through the sleeves 25. Thus any tendency to deform the tube 12 either by bending or by twisting is so distributed as to utilize the maximum strength of the tubing. The tubing, therefore, can be relatively light with the advantage of having the material utilized to its fullest extent in resisting the stresses to which it is subjected by the engagement of the plows on the individual bars with the soil. If any bar 11 becomes bent or damaged, it can be replaced quickly by removal of the securing rivet and no damage is done to the tube 12 by such replacement.

The sleeves 22 and 25 are shown in the drawings as being secured to the tube 12 by welding 27 completely encircling the sleeves. This is not necessary in all cases. The principal stresses communicated to the connection between the bars 11 and the tube 12 are in such direction that the edges of the tube engaging the sleeve receive them and there is little force exerted lengthwise of the sleeves 22. This construction eliminates heavy beams and clamping devices and makes a very light frame for the purpose intended.

From the foregoing description it is believed that the nature and advantages of my invention will be clear to those skilled in this art.

Having thus described my invention, I claim:

A frame for tillage implements comprising a metal tube having longitudinally spaced pairs of vertically aligned oblong rectangular apertures in the top and bottom portions thereof, said apertures being substantially longer transversely of the tube than lengthwise of the tube and having their long sides disposed diagonally across the tube, said tube having pairs of aligned front and rear oblong rectangular apertures extending horizontally through its side walls, and spaced lengthwise of the tube from the first named pair of apertures, the long axes of the last named pairs of apertures lying in planes parallel to the long axes of said first named pairs of apertures, whereby the rear apertures of the second named pairs of apertures are offset lengthwise of the tube from the front apertures of said second named pairs of apertures, a metal sleeve fitted in each pair of apertures and having its ends spaced from the tube, the sleeve being welded to the tube wall around each aperture, bars filling the sleeves extending through the several pairs of aligned apertures, the bars in the first named pairs of apertures being secured to the sleeves above the tube and extending downwardly beyond the sleeves to mount tillage implements, and the bars in the second named pairs of apertures being secured to their respective sleeves behind the tube and extending forwardly beyond the sleeves to serve as draw bars.

MILNER E. LARSEN.

REFERENCES CITED

The following references are of record in the file of this patent:

UNITED STATES PATENTS

| Number | Name | Date |
| --- | --- | --- |
| 67,483 | Baxter | Aug. 6, 1867 |
| 75,871 | Dahl | Mar. 24, 1868 |
| 1,523,072 | Ingersoll | Jan. 13, 1925 |
| 1,532,986 | Branson | Apr. 7, 1925 |
| 1,732,724 | Key | Oct. 22, 1929 |
| 1,888,945 | Bottrill | Nov. 22, 1932 |
| 1,984,916 | Bullock | Dec. 18, 1934 |
| 2,179,089 | Hauf | Nov. 7, 1939 |
| 2,430,223 | Goode | Nov. 4, 1947 |

FOREIGN PATENTS

| Number | Country | Date |
| --- | --- | --- |
| 10,164 | Great Britain | May 2, 1902 |